United States Patent [19]

Deal

[11] Patent Number: 5,361,169
[45] Date of Patent: Nov. 1, 1994

[54] DIVER'S MIRROR

[76] Inventor: Jerry L. Deal, 1228 Paloma Ave., Burlingame, Calif. 94010

[21] Appl. No.: 116,655

[22] Filed: Sep. 7, 1993

Related U.S. Application Data

[63] Continuation-in-part of Ser. No. 54,726, Apr. 29, 1993.

[51] Int. Cl.⁵ .................................................. G02B 5/08
[52] U.S. Cl. ...................................... 359/838; D10/2; D10/32; D10/38; D28/64.1; D28/64.2; D28/64.7; 359/517
[58] Field of Search .................... D6/300, 309; 2/170, 2/321, DIG. 8; 359/838, 840, 516, 517; D10/2, 30, 31, 32, 38, 111; D28/64.1–64.7

[56] References Cited

U.S. PATENT DOCUMENTS

| | | | |
|---|---|---|---|
| D. 79,071 | 7/1929 | Gebauer. | |
| D. 81,132 | 5/1930 | Gebauer. | |
| 1,966,860 | 7/1934 | Hughes | 359/517 |
| 2,327,513 | 8/1943 | Esterow | D28/78 |
| 2,737,851 | 3/1956 | Buchholtz | 359/517 |
| 3,019,710 | 2/1962 | Bean | 359/840 |
| 4,636,047 | 1/1987 | Green | 350/641 |
| 4,960,399 | 10/1990 | Lyon | 441/136 |
| 5,033,818 | 7/1991 | Barr | 350/174 |

Primary Examiner—Loha Ben
Assistant Examiner—Thomas Robbins
Attorney, Agent, or Firm—Laurence Coit

[57] ABSTRACT

A mirror which is attached to an underwater diver's wrist or arm. By placing the mirror in front of his face mask and controlling the line of sight reflected by the mirror, the diver can inspect equipment on his body or easily access equipment with the hand not wearing the mirror. In addition, the diver's peripheral vision is improved so he or she can see objects, fish or a diving partner located behind them. The mirror is attached to the diver's wrist or arm by a wrist strap made of water resistant material such as nylon or rubber. Alternate embodiments include a pouch containing the mirror on a flexible strap and a diver's handheld console with a hinged plate containing the mirror.

7 Claims, 11 Drawing Sheets

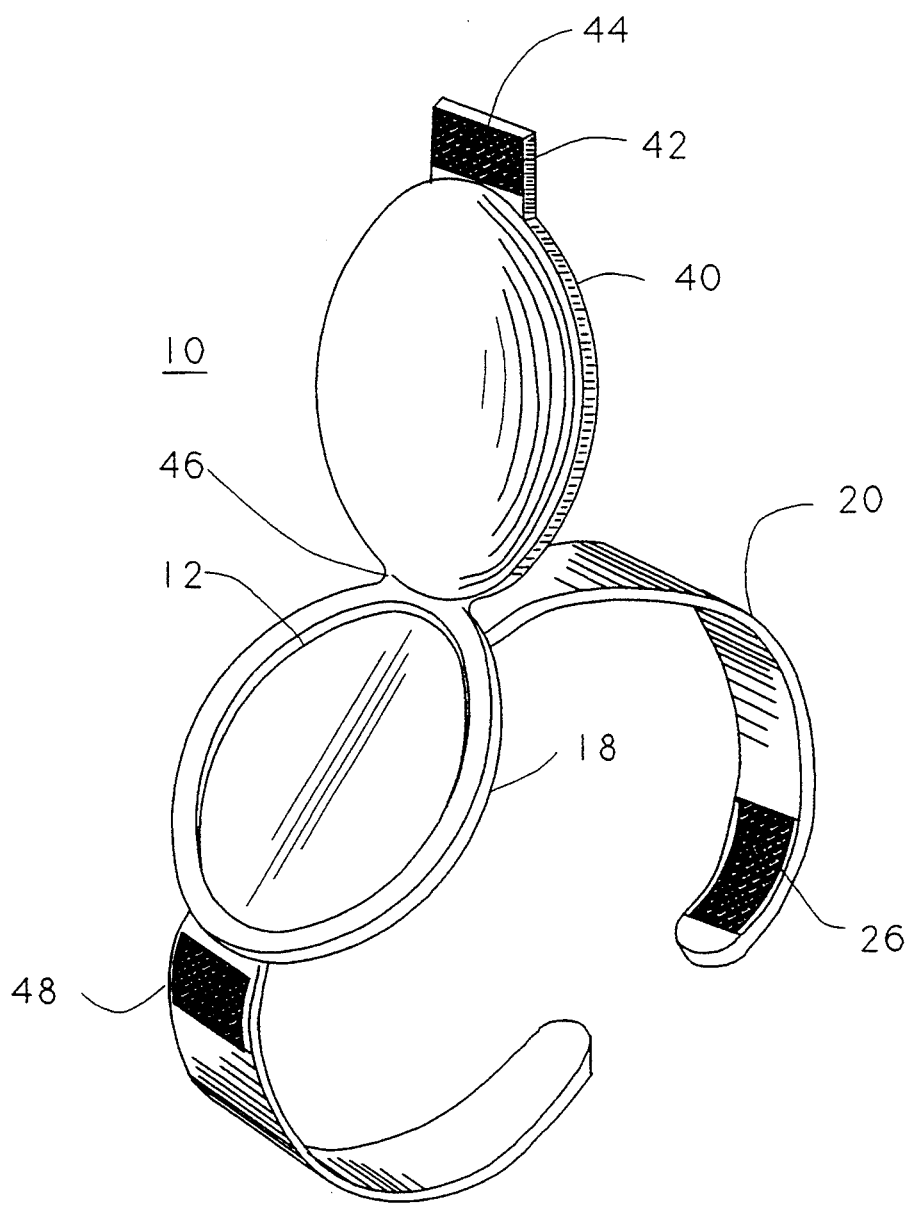
FIG. ID

DIVER'S MIRROR

This is a continuation-in-part of U.S. patent application Ser. No. 08/054,726 filed Apr. 29, 1993, pending.

BACKGROUND OF THE INVENTION

1. Field of the Invention

This invention relates to accessories for underwater divers and more particularly relates to an underwater mirror that can be used by the diver to see and check the diver's own equipment or to see behind him or her.

2. Description of Related Art

The underwater environment is both beautiful and dangerous. Divers must rely on their senses and mobility to avoid harm. However, the protective equipment and accessories necessary for the diver to survive in this environment have an ancillary and detrimental effect on visibility and mobility. Because a diver's visibility and mobility are restricted, a cardinal rule in diving is to always dive with a partner or "buddy." The diving partner can view a diver's immediate surroundings and warn of danger and can also assist a diver in adjusting or checking his or her equipment.

Three distinct categories of divers are typical. Free or snorkel divers use little equipment other than swim fins, a face mask and a snorkel that consists of a mouth piece attached to a tube extending above the water surface and allowing the diver to breathe while his or her head is slightly below the surface of the water. SCUBA (self contained underwater breathing apparatus) divers, on the other hand, wear a tank or tanks of compressed air allowing them to swim for extended periods of time at depths significantly below the surface of the water. The compressed air tank(s) are attached by one or more tubes to a breathing regulator to control the flow of air from the tank to the diver and to control or route exhaust from the diver's lungs to the environment. Because SCUBA divers can remain underwater for extended periods of time, they usually wear additional equipment to protect them from the environment, to enhance their enjoyment of the surroundings, and to allow them to accomplish work tasks while they are underwater. Examples of equipment used by SCUBA divers include a wet suit to protect them from cold water, a weight belt to counteract buoyancy, a vest to hold tools and equipment, a buoyancy compensator to adjust buoyancy, an accessory console to hold gauges, as well as cameras, spear fishing equipment, knives and various other accessories. Hard hat divers wear more substantial protection to allow them to descend to depths greater than those achievable by SCUBA divers. The hard hat diver wears a water impervious suit with a metal or composite material helmet attached. Air is provided to the diver by a tube extending to the surface and fed by an air compressor at the surface. Again, the hard hat diver uses various accessories to enhance his enjoyment of the surroundings, protect against the environment, provide for safety, or accomplish work related tasks.

All of these divers suffer restricted mobility and vision because of the equipment used. Some of the equipment restricts movement of the diver's head and therefore restricts the diver's view of his surroundings and especially the diver's view of equipment and accessories attached to his body. All diver's wear some form of face mask to insulate their eyes from the water. The face mask contains clear lenses held in front of the diver's eyes by a generally opaque rubber or silicon frame that seals out water from the diver's face. Because of this construction, a diver's face mask severely limits his or her peripheral vision. In the case of the free or snorkel diver, the face mask and snorkel restrict downward movement of his head, thus preventing a clear view of the upper portions of his body. The problem is compounded with the SCUBA diver where the air regulator, buoyancy compensator and wet suit further restrict his downward or side-m-side movement of his head. The problem is extreme with the hard hat diver as his peripheral vision is severely limited and he is totally unable to see his upper body.

This restricted mobility and restricted visibility make it extremely difficult for the diver to manually access or visually check equipment worn on his body and especially his upper torso or head. Often, it is necessary to have a diving partner check the diver's equipment or assist the diver in grasping equipment. Additionally, it is sometimes difficult in this hostile environment to locate a diving "buddy" or other divers due to the restricted peripheral vision and mobility. What is needed is a simple and effective device for improving a diver's peripheral vision. The improved peripheral vision assists the diver in gaining manual access or sight of equipment worn by the diver on his body or head, and provides an effective means for locating another diver, diving "buddy" or other objects without fully turning the body.

SUMMARY OF INVENTION WITH OBJECTS

One object of the present invention is to enhance the peripheral vision of an underwater diver.

Another object of the present invention is to increase a diver's safety by allowing the diver to easily see behind him to view danger or to locate a diving partner.

Another object of the present invention is to allow a diver to visually check equipment and accessories attached to his body.

Still another object of the present invention is to assist a diver in gaining manual access to equipment he wears in vests or belts around his body.

Yet another object of the present invention is to provide a means for increasing a diver's peripheral version which can be attached to an existing diver's console which contains a compass and other diver information displays.

These and other objects are attained with a mirror which is attached to the diver's wrist or arm. By placing the mirror in front of his face mask and controlling the line of sight reflected by the mirror, the diver can inspect equipment on his body or easily access equipment with the hand not wearing the mirror. One or more mirrors are attached to the diver's wrists or arms by wrist straps made of water resistant material such as nylon or rubber. One alternate embodiment of the invention consists of a pouch attached to the diver's wrist. The pouch contains the mirror which is attached by a flexible strap to the pouch. The diver can easily remove the mirror from the pouch and hold it in his or her palm to view objects. Another embodiment of the invention mounts the mirror on a hinged plate attached to a diver's console which contains a compass, depth gauge and other information displays. The hinged plate allows the diver to flip the mirror into an upright position allowing viewing of equipment on the diver's body and to aid in peripheral vision even while the compass or other displays are being viewed. A plurality of mirrors can be used on multiple, hinged plates to allow the diver to select the correct mirror for the task at hand.

BRIEF DESCRIPTION OF THE DRAWING

FIG. 1D is a perspective view of the diver's wrist mirror showing a protective cover for the mirror.

DETAILED DESCRIPTION OF THE PREFERRED EMBODIMENT

Figure 1A:
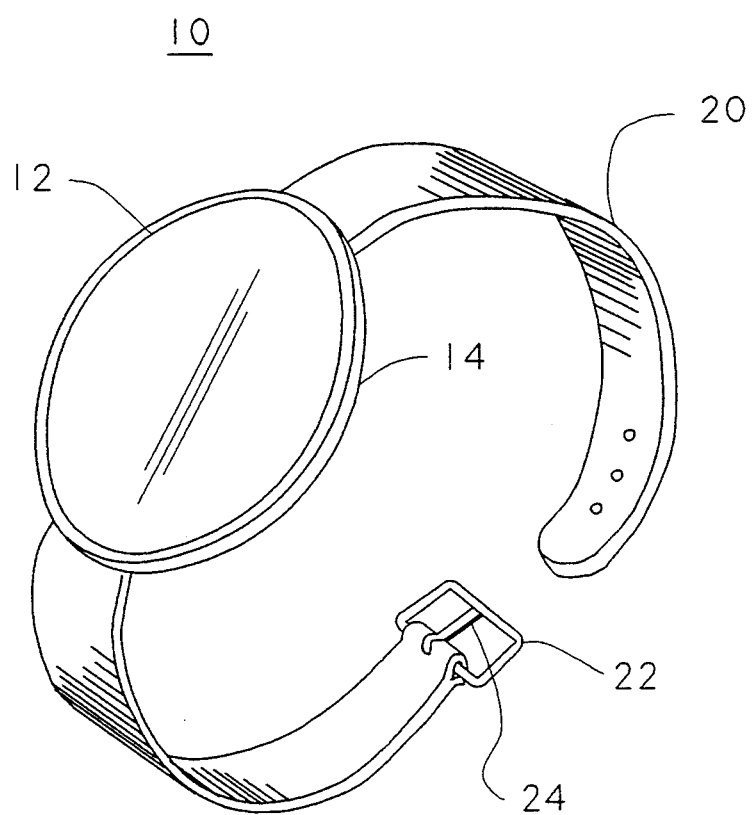
FIG. 1A is a perspective view of the diver's wrist mirror in which the reflective surface is flat.

Referring now to FIG. 1A, a perspective view of the diver's wrist mirror 10 is depicted. The diver's wrist mirror 10 consists of a reflective surface 12 attached to a wrist band 20. The reflective surface 12 can be constructed similar to mirrors well known in the art. Glass with reflective backing material, as is used in commercial grade mirrors, provides a clear and easily viewed image. Reflective surface 12 can be made from any corrosion resistant metal such as stainless steel, chrome or bronze. In the case of metals, the reflective surface 12 must be highly polished in order to attain an accurate reflection. Although reflective surface 12 is depicted as circular in planar view, it is readily understood that it may be any shape including rectangular or hexagonal. The reflective surface 12 is mounted to backing plate 14 made of any corrosion resistant material such as plastic, bronze or stainless steel. Wrist band 20 is made from corrosion resistant material such as plastic, NYLON, rubber or leather. The band is formed in a manner similar to the bands used on wrist watches. A clasp 22 is attached at one end and contains pin 24 which can be inserted into one of a plurality of apertures in the opposite end of the band. In this manner, the circumference of the band can be adjusted to fit wrists or forearms of varying size. Alternate clasping mechanisms such as VELCRO attachments or clamps, as are commonly found in wrist watch bands can be used. The central section of band 20 is attached to the backside of backing plate 14 by any of a number of means. The simplest means of attachment is to glue the band 20 to backing plate 14 with a water resistant glue.

Figure 1B:
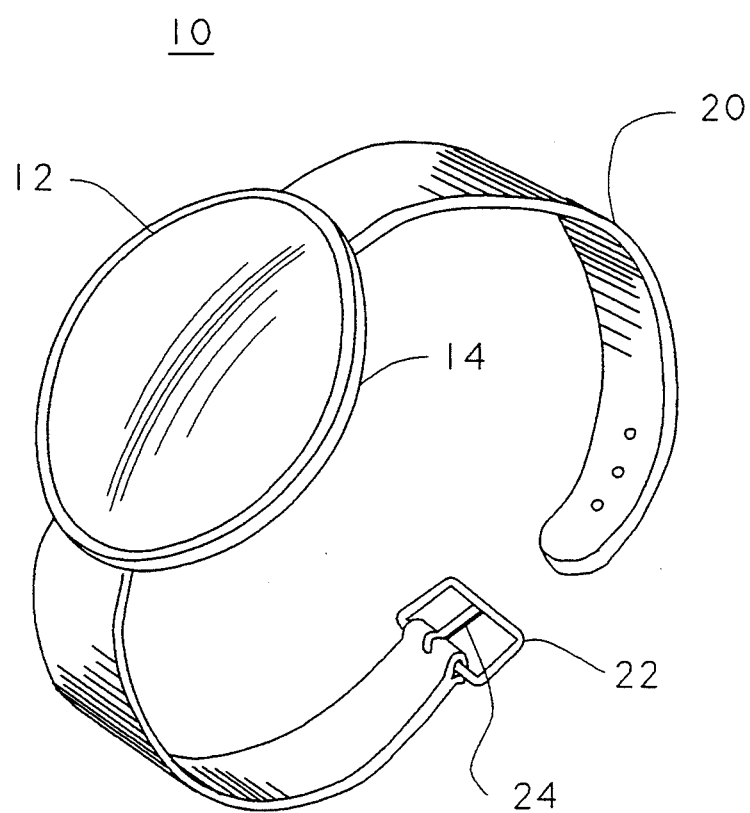
FIG. 1B is a perspective view of the diver's wrist mirror in which the reflective surface is convex thereby providing a wide angle view to the diver.
Figure 1C:
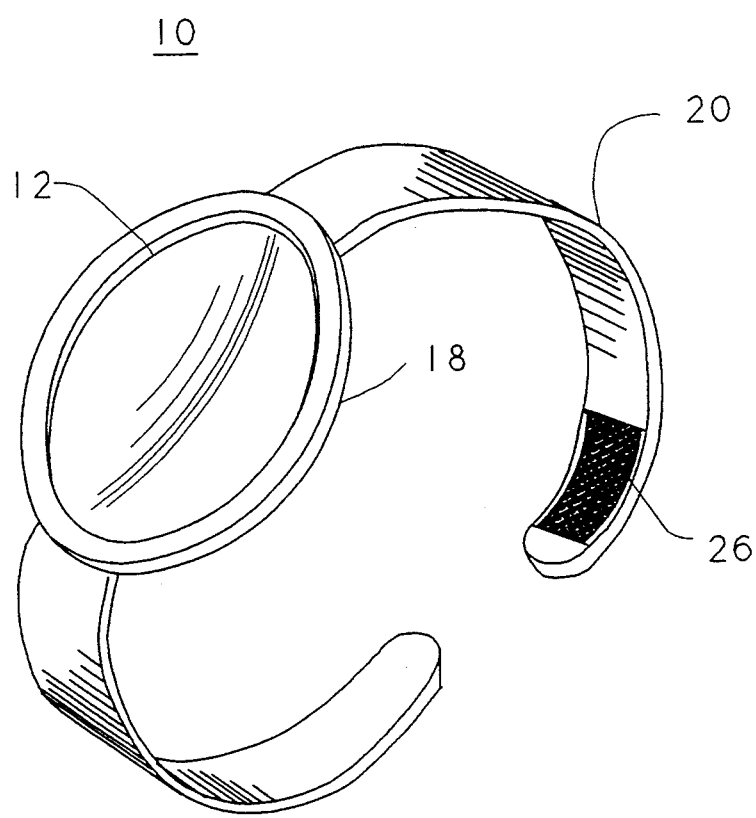
FIG. 1C is a perspective view of the diver's wrist mirror in which the reflective surface is concave thereby providing a magnified image to the diver.

FIG. 1A depicts reflective surface 12 as a flat surface. In this embodiment, the image reflected to the diver is true and undistorted. However, certain advantages can be attained by using other than a flat surface. For instance, the reflective surface 12 can be formed as a convex or concave surface as is well known in the art of optics. The convex surface shown in FIG. 1B will have the effect of increasing the user's field of vision. Although the image appears smaller to the diver, a wider angle can be seen. This embodiment is especially useful for the diver to see his entire upper torso, head or surroundings behind him at one glance without having to pan the image to various locations of interest. FIG. 1C shows another embodiment of the invention wherein the reflective surface 12 is concave. This embodiment narrows the diver's field of vision but provides magnification for detailed work. In addition, FIG. 1C shows an alternate embodiment of the clasp mechanism which consists of VELCRO material 26 attached to the inside surface of one end of band 20. The opposite end of band 20 contains matching VELCRO material on its exterior (not shown). In this manner, the circumferential length of band 20 can be adjusted and the VELCRO material will hold the adjustment as is well known in the art. Another optional feature shown in FIG. 1C is a rubber or neoprene protective gasket 18 which surrounds the edges of mirror 10 and backing plate 14 (not shown). In this manner, mirror 12 is protected from scrapes or edgewise blows which could serve to detach the mirror 12 from the backing plate 14 (not shown). Although the VELCRO attachment 26 and the protective gasket 18 are shown on the embodiment depicted in FIGS. 1C and 1D, these features are also applicable to the embodiments shown in FIGS. 1A, 1B, and 1E.

Turning now to FIG. 1D, an alternate embodiment of the invention is depicted with a protective cover for mirror 12. The protective cover 40 is shaped to coincide with the face of mirror 12 and is flat, and planar. The protective cover 40 is made from soft, water resistant material such as plastic, rubber or neoprene. The cover 40 is connected to gasket 18 or band 20 with a hinge 46 made from flexible material. The opposite end of cover 40 contains a rectangular tab 42 extending from cover 40 diametrically opposite from the hinge. Attached to the surface of tab 42 is VELCRO material 44. On band 20, at a position opposite the hinge 46 is another VELCRO surface 48. By folding cover 40 over mirror 12 and securing tab 42 to surface 48, the mirror is protected from damage. When the diver needs to view mirror 12, he or she can easily detach tab 42 from surface 48 and open cover 40 to reveal the surface of mirror 12.

Figure 1E:
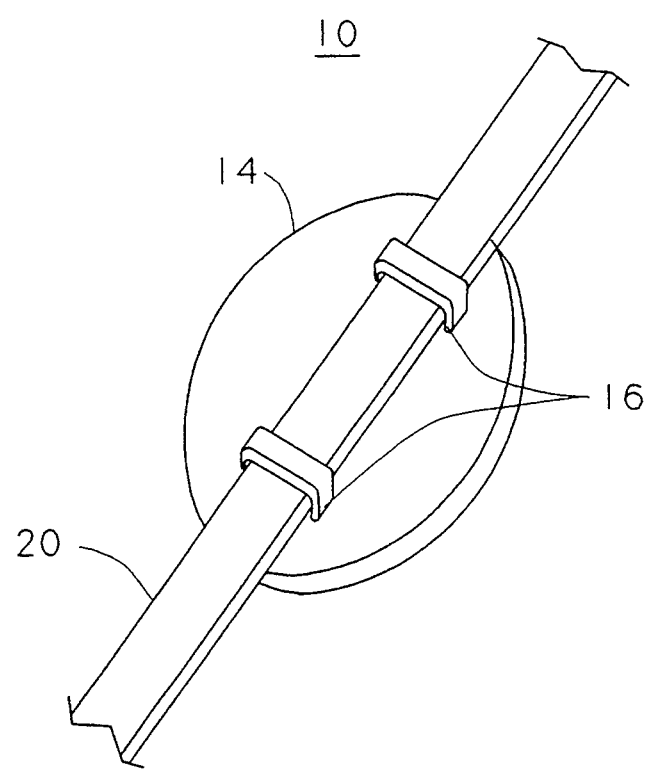
FIG. 1E is a perspective view of the back side of diver's wrist mirror showing one possible means of attaching the wrist band.
Figure 1F:
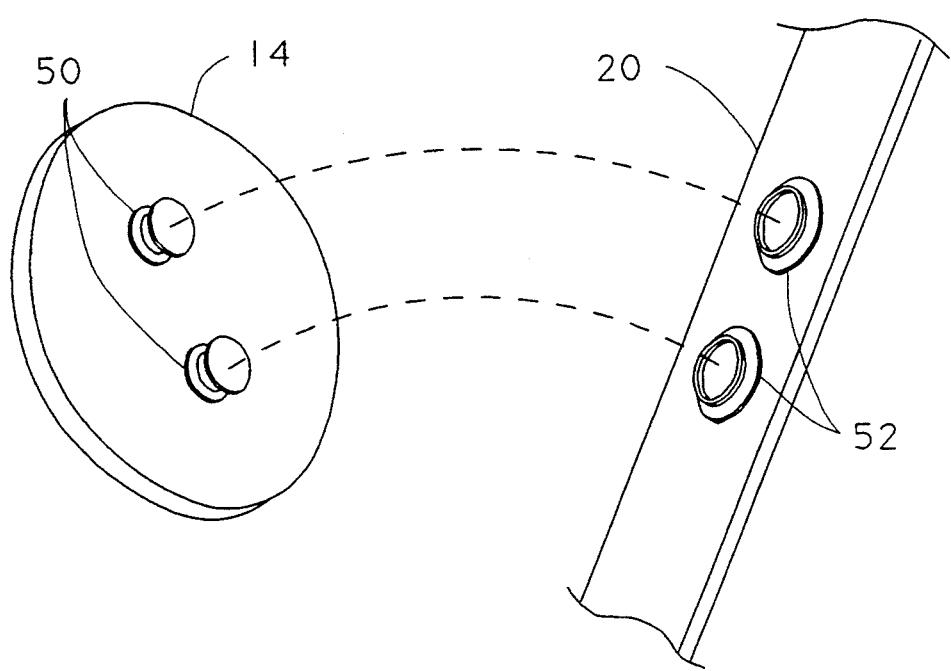
FIG. 1F is a perspective view of the back side of the diver's mirror showing an alternate method of attaching the wrist band.

As previously described, band 20 can be glued to backing plate 14. Referring now to FIG. 1E an alternate means of attachment is depicted. In this embodiment, loops 16 having a width slightly greater than that of band 20 are permanently attached to the back of backing plate 14. The loops 16 are in axial alignment allowing band 20 to be threaded therethrough. After band 20 is threaded through loops 16, the band is attached to a diver's wrist by fastening the clasp mechanisms previously described. Loops 16 can be molded directly into a plastic backing plate 14 or soldered, brazed or welded to a metal backing plate 14 thus providing a strong and reliable attachment of mirror 10 to band 20. Referring now to FIG. 1F, yet another means of attaching band 20 to backing plate 14 is depicted. Mounted on the back of backing plate 14 are corrosion resistant snaps 50. The snaps 50 can be directly cast into backing plate 14 during manufacture or can be attached with water resistant glue. Attached to band 20 are corrosion resistant snap receptors 52. By depressing snaps 50 into snap receptors 52, the band is firmly attached to backing plate 14 but can easily be removed by pulling the snaps 50 from receptors 52. An advantage to this type of connection is that reflective surfaces 12 having different shapes or surfaces can be quickly and easily interchanged and used with the same band 20. In addition, bands 20 of different colors can be interchanged.

Figure 2:
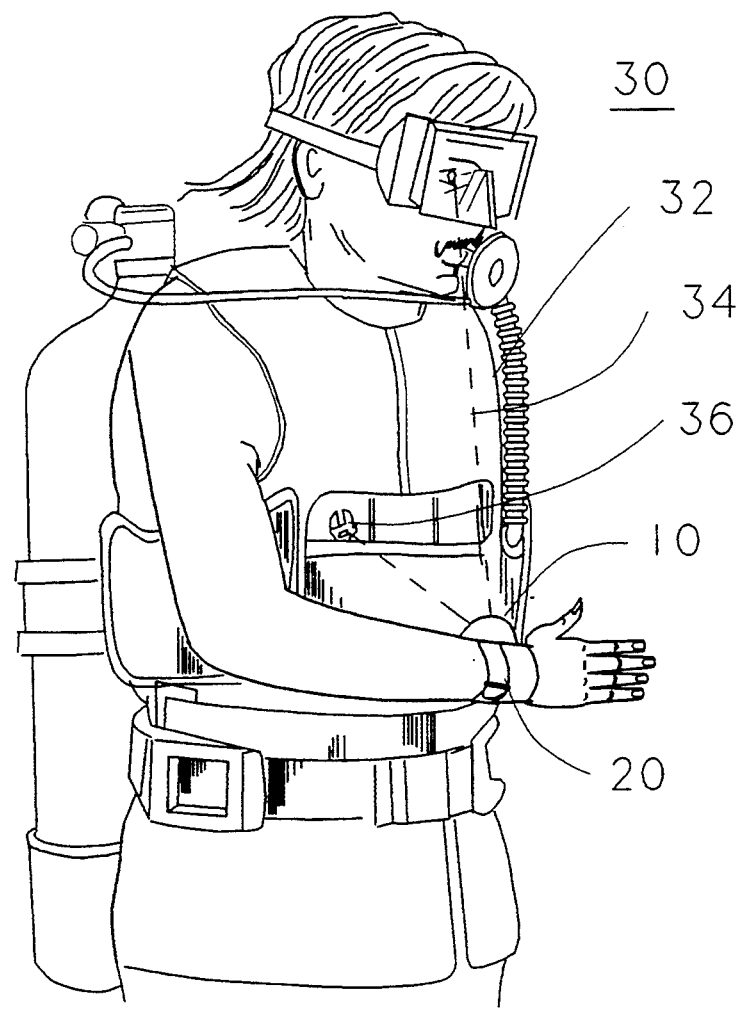
FIG. 2 is a perspective view of a diver using the wrist mirror to see a tool contained in accessory pockets of his buoyancy compensation vest.

Turning now to FIG. 2, depicted is a diver 30 using mirror 10. Mirror 10 is attached to the diver's wrist or forearm using band 20. Although only one mirror 10 is depicted, it is readily understood that a diver may use mirrors on each wrist or forearm to improve peripheral vision. The mirror 10 is oriented on the diver's wrist such that reflective surface 12 is facing away from the diver's wrist and can be easily viewed by the diver. In addition, the reflective surface 12 can be adjusted to any circumferential position on the diver's wrist by simply loosening band 20, moving the mirror to the desired position and tightening band 20 to hold the reflective surface 12 in that position. In this manner, the diver can adjust the mirror 10 for easy viewing regardless of what attitude his body takes while diving. As shown in FIG. 2, the diver 30 is wearing a buoyancy compensation vest 32 containing accessory pockets as are commonly used by divers. The buoyancy compensation vest 32 contains a wrench 36 in a pocket. As is readily apparent from the illustration, it would be very difficult for the diver to look down and see the wrench 36 because the downward movement of his head is restricted by his air regulator, face mask and the vest 32 itself. By viewing the wrench 36 through mirror 10 along line of sight 34, the diver can easily see and locate wrench 36.

Figure 3:
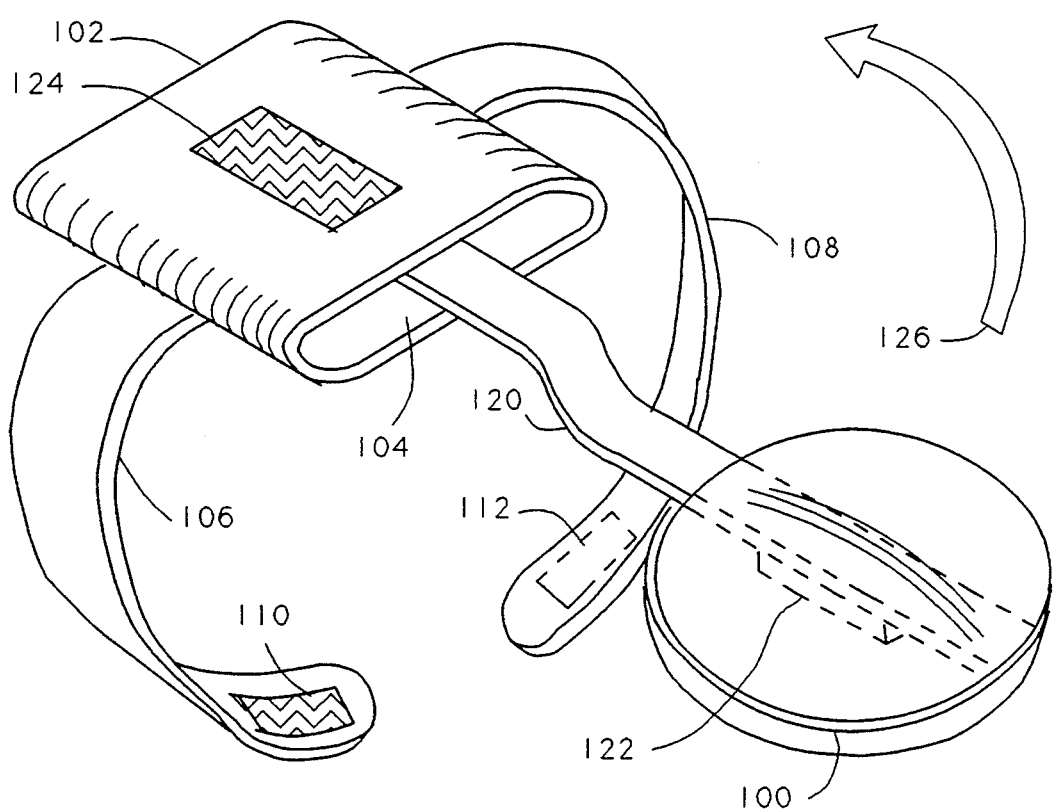
FIG. 3 is a perspective view of an alternate embodiment of the invention where the mirror is contained in a pouch attached to the diver's wrist.

Referring now to FIG. 3, an alternate embodiment of the invention is depicted. In this embodiment, the mirror is contained in a pouch which is attached to the diver's wrist. In this embodiment, mirror 100 is housed in a neoprene pouch 102. Mirror 100 can be of the flat, convex or concave style previously described. The neoprene pouch is shaped in the form of flat, hollow sleeve closed at one end and the interior dimensions of pouch 102 are slightly smaller than the exterior dimensions of mirror 100. The opposite end of pouch 102 contains opening 104 which allows the insertion and removal of mirror 100. Because the interior dimensions of pouch 102 are slightly smaller than the exterior dimensions of mirror 100, the mirror 100 is held securely within the pouch 102 after insertion. Attached to the bottom of pouch 102 are two flat straps 106 and 108 which extend parallel to opening 104. The distal ends of straps 106, 108 contain sections of VELCRO material 110, 112 on the flat surfaces thereof. The material 110 on strap 106 is on the upper surface of the strap 106 (as shown) while the material 112 on strap 108 is on the lower surface. It is readily understood that the VELCRO material can be on the opposite sides of the flat straps. The straps 106, 108 form a wrist band which can be mounted on a diver's wrist with the VELCRO material holding the band in a secure position on the diver's wrist. VELCRO strips 110 and 112 are long enough so that the circumferential length of straps 106, 108 forming the band can be adjusted to accommodate different sized wrists. In this manner, pouch 102 is held securely to the diver's wrist. Extending from the interior of pouch 102 is another elongated, flat strap 120. One end of strap 120 is sewn or otherwise attached such as by means of water proof glue to the interior upper or lower surfaces of pouch 102. The opposite end of strap 120 is attached to the back side of mirror 100. The lower surface of strap 120, where it connects to mirror 100 contains a section of VELCRO material 122. A mating section of VELCRO material 124 is mounted on top of the pouch 102.

To use this embodiment of the invention, the diver straps the pouch 102 to his or her forearm using the straps 106, 108. Preferably, the pouch 102 is located on the palm side of the forearm a few inches from the wrist. The mirror 100 is housed within the pouch 102 with strap 120 folded within the pouch 102. In this manner, the mirror is protected by the pouch 102 from abrasion as the diver swims or examines formations. When the diver needs the mirror 100 for viewing, the diver withdraws the mirror 100 from pouch 102 and holds it in his or her palm. The mirror 100 is prevented from falling or being lost by strap 120. Strap 120 is a flat neoprene strap which can be easily flexed. Although strap 120 is depicted as a flat, neoprene strap, it is readily understood that it could be a cord of any corrosion resistant, flexible material or a stainless steel cable. This embodiment of the invention offers the advantage that the diver can more easily position the mirror for a clear view by holding it in his or her palm. Thus, the diver can position the mirror using the full flexibility of the wrist. If the diver desires to use the mirror 100 in a manner similar to that previously described, the mirror 100 can be positioned on top of the pouch 102 by folding strap 120 in the direction of arrow 126 and mating VELCRO material 122 to 124 thus securing mirror 100 on top of pouch 102. When the diver is through using the mirror 100, it can again be housed in pouch 102 for protection.

Figure 4:
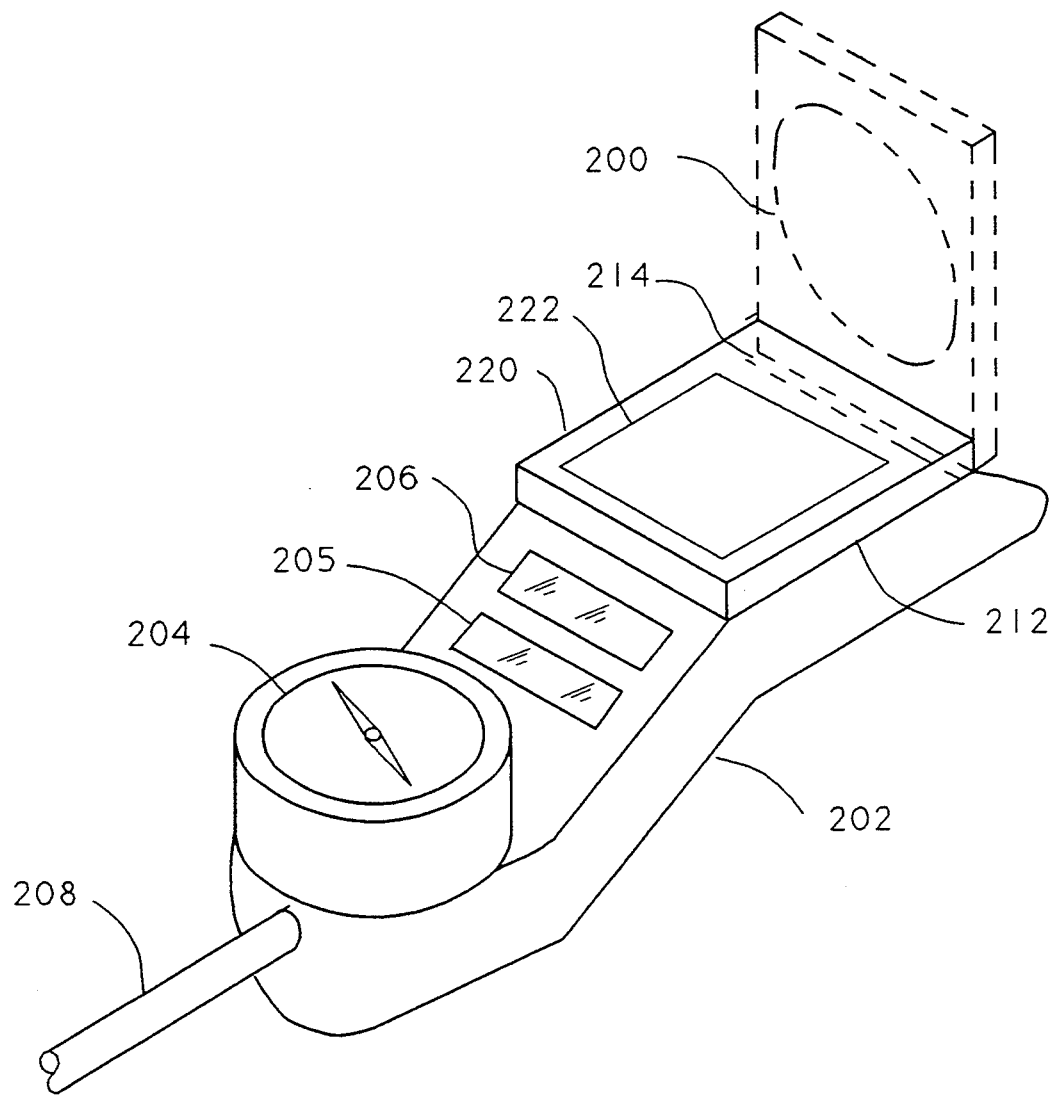
FIG. 4 is a perspective view of an alternate embodiment of the invention where the mirror is attached with a hinge to a diver's console.

Turning now to FIG. 4, another embodiment of the invention is depicted. In this embodiment, the mirror 200 is attached to a plate 2 12 which is hinged to a diver's console 202. Diver's console 202 is of the hand held type commonly used by divers. The console 202 contains a compass 204, a digital clock readout 205 and an air tank pressure gauge 206. The console 202 is usually connected to the diver's air tank (not shown) by hose 208 which provides the input to the pressure gauge 206. As is well known in the art, diver's console 202 can include many other displays such as temperature, etc. In this embodiment of the invention, mirror 200 is attached to plate 212. As with previously described embodiments of the invention, mirror 200 can be flat, convex, or concave. Plate 212 is connected to console 202 with a flexible hinge 214 on one edge so that plate 212 can be folded flat to the console 202 or flipped up to a position near perpendicular to the console 202. The hinge 214 can be flexible material such as neoprene or a pinned hinge made out of corrosion resistant material. Mirror 200 is attached to the underside flat surface of plate 212. The backside 220 of plate 2 12 is a slate 222 suitable for writing with a lead pencil. When plate 2 12 is in the folded down position, a clasp (not shown) holds the plate 212 flat against console 202 so that slate 222 is readily accessible to the diver for writing messages to other divers. When plate 212 is flipped up, mirror 200 is available for the diver to view his or her surroundings in a manner previously described. In addition, because the hinge 214 is adjustable, the diver can hold plate 212 between his or her thumb and forefinger and adjust the attitude of the mirror 200 thus providing more flexibility in viewing the diver's surroundings. Again, if plate 212 is in the folded position, mirror 200 is protected from abrasion while the diver is swimming, working or exploring.

Figure 5:
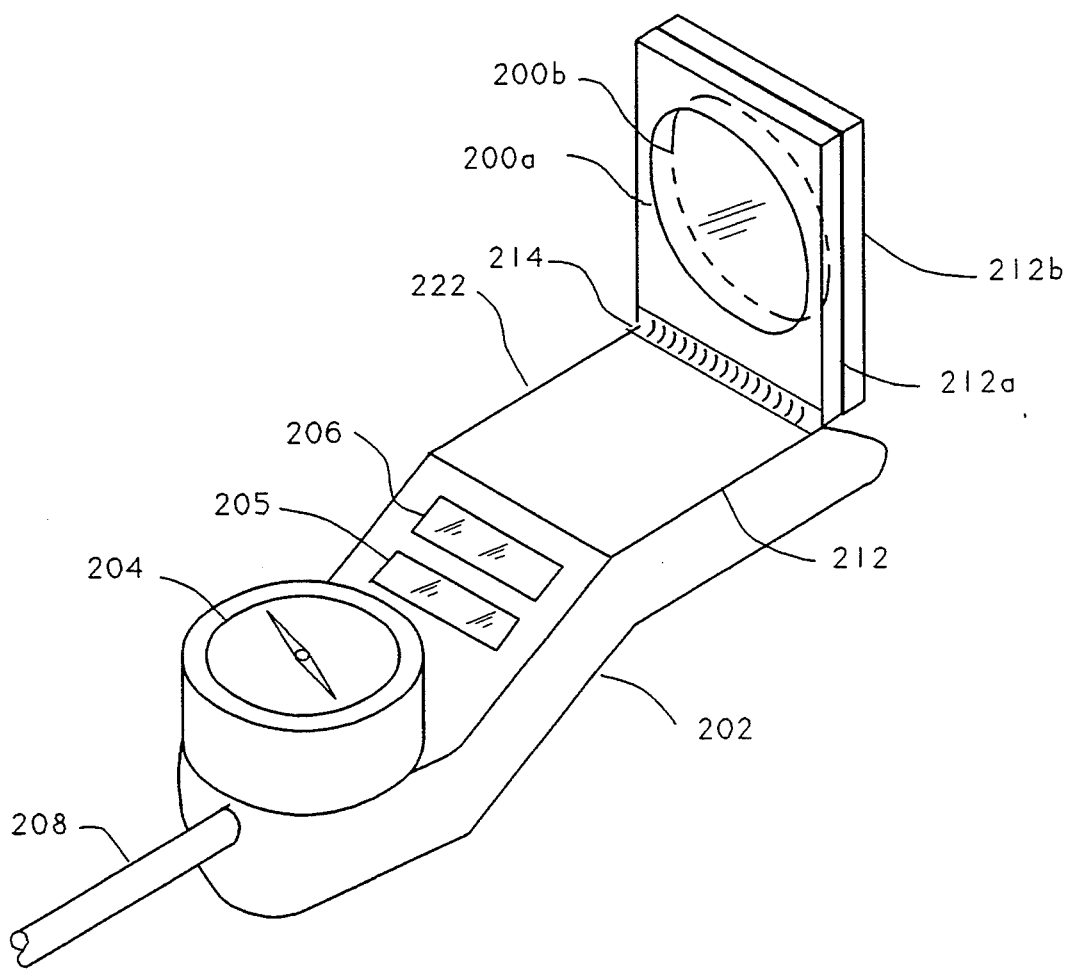
FIG. 5 is a perspective view of an alternate embodiment of the invention where multiple mirrors are attached to a diver's console.

Referring now to FIG. 5 a variation of the embodiment shown in FIG. 4 is depicted. In this variation, console 202 contains multiple plates 212a and 212b are hinged to the console. In this embodiment, different mirrors 200a and 200b are attached to the hinged plates 212a and 212b. In this manner, the diver can select which mirror to flip to the viewing position to suit the particular circumstances. For instance, mirror 200a could be a flat minor for general viewing and mirror 200b could be a concave minor for close work viewing. Although only two mirrors are depicted, it is readily understood that any number of hinged plates and alternate mirrors can be attached to the same console.

Figure 6:
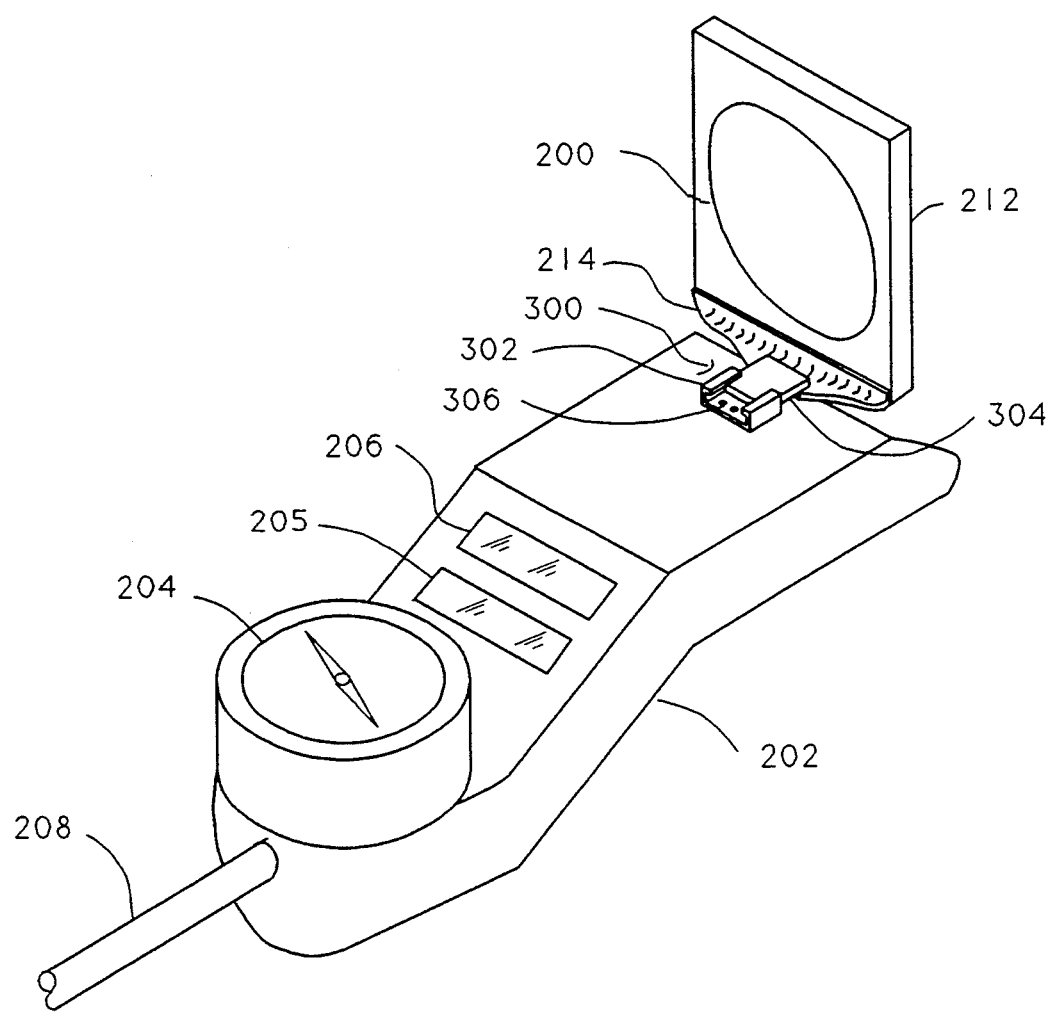
FIG. 6 is a perspective view of an alternate embodiment of the invention where the mirror is attached to an existing diver's console with an adapter.

The mirror 200 is depicted in FIGS. 4 and 5 attached to the console 202 as a unitary structure and can be built into the many diver's consoles which are available. However, FIG. 6 shows an embodiment of the invention which is specifically designed to be an add-on feature to existing consoles which do not presently contain mirrors. In this embodiment, an adapter 300 is used to attach the plate 212 to an existing console 202. The adapter 300 consists of a bayonet shoe 302 and a bayonet slide 304. The bayonet shoe 302 is attached to the console 102 with fasteners 306. Hinge 214 is attached to mirror plate 212 and to bayonet slide 304. Slide 304 can be inserted into shoe 302 in a manner similar to that used to connect flash attachments to cameras. In this manner, mirror 200 can be added to an existing console 202 and provide the same benefits of the unitary design without the user having to replace the console entirely.

In use, the mirror 10 greatly extends the diver's peripheral vision. The mirror 10 allows the diver to see behind him or her without turning the body. The mirror 10 also allows the diver to view and access equipment mounted on his upper torso or head, or held in pockets of a buoyancy compensation vest worn around the upper body. The normal restriction of movement and vision caused by the diver's face mask, wet suit and breathing regulator is thus alleviated. In this manner, the diver can easily check his own gear and grasp accessory equipment. Thus, whether the diver is performing work underwater or just enjoying the surroundings, his actions become more efficient and his safety is significantly improved. In addition, because the diver can easily view and check his own equipment, the diver's safety is further improved. By eliminating the need to have a diving partner inspect equipment or assist in accessing equipment, the diving partner's efficiency and safety are also improved. Yet another benefit to the diver's mirror 10 is that the diver wearing the mirror 10 can use it as an inspection mirror to view into small or fight places. This inspection capability is very useful when the diver is performing work underwater or when he is viewing marine life forms which typically habitat crevices under or within rocks or coral. Another safety benefit allows a diver to check on the location of a diving buddy, other divers, or other objects of interest without turning the body.

Thus having described various embodiments of a simple, but exceedingly useful diver's accessory, it is readily understood that those skilled in the art can develop and use other embodiments using different materials or methods of manufacture without departing from the spirit or scope of the invention now claimed.

I claim:

1. A diver's mirror comprising:
   a reflective surface;
   a flexible strap having first and second ends, said first end being connected to said reflective surface;
   a pouch for housing said reflective surface when not in use, said pouch being connected to said second end of said strap; and
   means for attaching said pouch to said diver's wrist;
   whereby said diver can easily remove said reflective surface from said pouch and hold said reflective surface in the palm of a hand and view his upper torso, head, or surroundings by adjusting the inclination of said reflective surface and viewing the reflected image of said reflective surface.

2. A diver's mirror as recited in claim 1 wherein said reflective surface is flat.

3. A diver's mirror as recited in claim 1 wherein said reflective surface is convex.

4. A diver's mirror as recited in claim 1 wherein said reflective surface is concave.

5. A diver's mirror as recited in claim 1 wherein said means for mounting said pouch further comprises a flexible wrist band.

6. A diver's mirror as recited in claim 5 wherein said wrist band is circumferentially adjustable.

7. A diver's mirror as recited in claim 5 wherein said wrist band further comprises a clasp allowing circumferential length adjustment of said band and firmly positioning said mirror on said diver's forearm.

* * * * *